(12) United States Patent
Pirilä et al.

(10) Patent No.: US 7,076,799 B2
(45) Date of Patent: Jul. 11, 2006

(54) CONTROL OF UNCIPHERED USER TRAFFIC

(75) Inventors: Hannu Pirilä, Littoinen (FI); Mikko Kanerva, Helsinki (FI); Juha Kurkilahti, Piikiö (FI)

(73) Assignee: Nokia Corporation, Espoo (FI)

( * ) Notice: Subject to any disclaimer, the term of this patent is extended or adjusted under 35 U.S.C. 154(b) by 741 days.

(21) Appl. No.: 10/311,434

(22) PCT Filed: Jun. 25, 2001

(86) PCT No.: PCT/FI01/00601

§ 371 (c)(1),
(2), (4) Date: Dec. 18, 2002

(87) PCT Pub. No.: WO02/01904

PCT Pub. Date: Jan. 3, 2002

(65) Prior Publication Data

US 2003/0152232 A1    Aug. 14, 2003

(30) Foreign Application Priority Data

Jun. 26, 2000    (FI)    .................................. 20001512

(51) Int. Cl.
*G06F 1/26*    (2006.01)
(52) U.S. Cl. ............................. 726/5; 713/17; 713/18; 713/19
(58) Field of Classification Search .................. 726/5, 726/17, 18, 19
See application file for complete search history.

(56) References Cited

U.S. PATENT DOCUMENTS

| | | | |
|---|---|---|---|
| 4,736,094 A * | 4/1988 | Yoshida | 705/41 |
| 5,077,791 A | 12/1991 | Salihi | |
| 5,509,075 A | 4/1996 | Grube et al. | |
| 5,561,706 A | 10/1996 | Fenner | |
| 5,678,186 A * | 10/1997 | Lee | 455/437 |
| 5,839,071 A * | 11/1998 | Johnson | 455/440 |
| 5,933,114 A * | 8/1999 | Eizenhofer et al. | 342/457 |
| 5,940,751 A | 8/1999 | Kaplan et al. | |
| 5,956,634 A | 9/1999 | Otterson et al. | |
| 6,104,922 A | 8/2000 | Baumann | |
| 6,112,079 A | 8/2000 | Lamb | |
| 6,377,804 B1 * | 4/2002 | Lintulampi | 455/435.2 |

FOREIGN PATENT DOCUMENTS

WO    WO 00/02406    1/2000

* cited by examiner

*Primary Examiner*—Thomas R. Peeso
(74) *Attorney, Agent, or Firm*—Squire, Sanders & Dempsey LLP

(57) ABSTRACT

In a communications system, the subscriber data in a home network of a subscriber is provided with a subscriber ciphering profile, which indicates whether an unciphered call, session or data packet is to be rejected, accepted or handled in some other manner. A serving network checks the subscriber ciphering profile in one or more of the following cases: 1) for each setup of an unciphered call or connection, 2) for each unciphered packet switched data transmission session, or 3) for each packet data transmission originating from subscriber equipment, and rejects or accepts the unciphered call, connection, session, or data packet, respectively, according to the subscriber ciphering profile. As a result, unciphered calls, sessions, or packet data transmissions will be reliably rejected.

19 Claims, 1 Drawing Sheet

CONTROL OF UNCIPHERED USER TRAFFIC

FIELD OF THE INVENTION

The invention relates to avoiding eavesdropping and impersonation in communications systems, and more specifically, to controlling unciphered traffic in communications systems.

BACKGROUND OF THE INVENTION

Wireless communications system refers generally to any telecommunications system which enables a wireless communication between a user terminal and a network. In a mobile communications system the users are able to move within the service area and to use its services. A typical mobile communications system is the Public Land Mobile Network (PLMN). Often the mobile communications network is an access network providing a user with a wireless access to external networks, hosts, or services offered by specific service providers.

In second-generation mobile systems, such as the Global System for Mobile Communication (GSM), speech and data are transmitted in a digital form. In addition to conventional speech transmission, digital mobile communication systems provide a plurality of other services: short messages, facsimile, data transmission, etc.

The general packet radio service GPRS is a new service in the GSM system (Global System for Mobile communication). A subnetwork comprises a number of packet data service nodes SN, which in this application will be referred to as serving GPRS support nodes SGSN. Each SGSN is connected to the GSM mobile communication network (typically to a base station controller BSC or a base station BTS in a base station system) so that the SGSN can provide a packet service for mobile data terminals via several base stations, i.e. cells. The intermediate mobile communication network provides a radio access and packet-switched data transmission between the SGSN and mobile data terminals. Different subnetworks are in turn connected to an external data network, e.g. to a public switched data network PSPDN, via GPRS gateway support nodes GGSN. The GPRS service thus allows to provide packet data transmission between mobile data terminals and external data networks when the GSM network functions as a radio access network RAN.

Third-generation mobile systems, such as the Universal Mobile Communications system (UMTS) and the Future Public Land Mobile Telecommunications system (FPLMTS), later renamed as IMT-2000 (International Mobile Telecommunication 2000), are being developed. In the UMTS architecture an UMTS terrestrial radio access network, UTRAN, provides User Equipments UE with a wireless access to one or more core networks (CN). The UTRAN consists of at least one radio network controller RNC and a multiplicity of base stations BS. The core networks using the UMTS radio access network include the GSM and the GPRS.

FIG. 1 is a block diagram which gives an overview of the user equipment registration and connection principles within the UMTS in a circuit switched (CS) service domain (e.g. a GSM core network) and a packet switched (PS) service domain (e.g. a GPRS core network). As in conventional GSM/GPRS systems, user identification, authentication and key agreement will take place independently in each service domain. In the CS service domain a circuit switched connection is set up between the UE and a third-generation (3G) mobile services switching center (MSC) or an integrated MSC/VLR (Visitor Location Register). In the PS domain a packet switched virtual connection is established between the UE and a serving GPRS support node (SGSN). In FIG. 1, the CS and PS service domains have a common subscription database HLR (Home Location Register) which stores subscriber data for the users of the UEs. A part of the subscriber data is copied to the CS and PS service domains (e.g. to the VLR and SGSN, respectively) when the UE registers to the corresponding service domain. The security aspects of the UMTS are defined in the technical specification 3G TS 33.102 version 3.4.0 by the $3^{rd}$ Generation Partnership Project. This document is incorporated by reference herein. Authentication and key agreement are illustrated in chapters 6.3 and 6.4. of the 3G TS 33.102 document. User traffic can be ciphered using the cipher key agreed for the corresponding service domain as illustrated in chapters 6.6. and 6.7 of the 3G TS 33.102 document.

In the UMTS, also unciphered calls or sessions are possible if agreed by the UE and the network. In wireless systems eavesdropping at the air interface is a real problem. This is especially the case in packet data transmission systems like the GPRS where authentication is carried out at the beginning of the virtual connection. A virtual connection means that the UE and the SGSN have created packet data protocol (PDP) contexts which enable to transmit data packets to and from the UE at any time, while the physical channel is reserved only for the actual transmission, which is called a session herein. No authentication is carried out for individual sessions. This approach allows a transmission without delay and optimizes the use of the radio resources at the air interface. The drawback in this approach is that a third party terminal or base station can in principle transmit or receive data for eavesdropping purposes. Also in circuit switched calls, the user may wish to use ciphering in all situations.

Therefore, there is a need for a reliable method for controlling unciphered calls or sessions.

DISCLOSURE OF THE INVENTION

An object of the present invention is to provide reliable method and means for controlling unciphered traffic in a wireless communications system.

The object is achieved by a method, system and subscriber equipment characterized by what is disclosed in the attached independent claims 1, 9 and 17, respectively. The preferred embodiments of the invention are disclosed in the attached dependent claims.

According to the present invention, the subscriber data in a home network of a subscriber is provided with a subscriber ciphering profile which indicates whether an unciphered call, session or data packet is to be rejected, accepted or handled in some other manner. For example, a serving network may check the subscriber ciphering profile in one or more of the following cases: 1) for each setup of an unciphered call or connection, 2) for each unciphered packet switched data transmission session, or 3) for each packet data transmission originating from subscriber equipment. The function performed by the serving network depends on the subscriber ciphering profile and may include one or more of the following functions: rejection or acceptance of the unciphered call, connection, session, or data packet, respectively, or reauthentication of the subscriber equipment. As a result, the unciphered calls, sessions, or packet data transmissions will be reliably rejected if the network operator or the user sets the subscriber ciphering profile accordingly. Reauthentication prevents impersonation by a third party especially in mobile-originated transactions. In that case, if the subscriber equipment is succesfully reauthenticated, the network may ultimately accept the unciphered transaction, since the impersonation has been prevented. No support from the user equipments is necessarily required for this new functionality, and thereby the functionality can be readily introduced in existing networks for all user terminals. This approach is more reliable than an alternative approach in which the rejection would be controlled by a user-settable flag in the user equipment. In the latter approach, the network would not know the status of the flag in the user equipment and hence would not be sure whether the session or packet data transmission can be started when requested. The alternative approach could be implemented only in new user terminals and would not be available for all users.

The present invention is especially beneficial in packet switched transmission. In an embodiment of the invention, in order to prevent eavesdropping or impersonation, the network is arranged to reject any unciphered data transmission sessions, if the subscriber ciphering profile does not allow unciphered user traffic. In a further embodiment of the invention the network is arranged to discard all unciphered data packets which seem to be originating from the subscriber equipment but may originate fraudulent subscriber equipment (impersonation) during an accepted session (if the subscriber ciphering profile does not allow unciphered user traffic). In a still further embodiment, reauthentication of the subscriber is triggered in response to unciphered data transmission session or data packet, if required by the subscriber ciphering profile. In that case, if the subscriber equipment is successfully reauthenticated, the network may ultimately accept the unciphered session or data packet, since the impersonation has been prevented. Because the reauthentication is made only in special circumstances controlled by the subscriber ciphering profile, no delay is caused for normal traffic. These embodiments allow for high security also during discrete data packet transmissions, although the subscriber equipment is normally authenticated only when a virtual connection is setup.

According to the preferred embodiment of the invention, the subscriber ciphering profile is also sent to subscriber equipment of the user, e.g. in association with the authentication of the subscriber. Thus, the user equipment is also able to check the subscriber ciphering profile locally and to reject or accept unciphered calls, connections or sessions accordingly. This makes the control of the unciphered calls and sessions even more reliable.

According to an embodiment of the invention, the subscriber is able to modify the subscriber ciphering profile in the network over the air interface. Thus, the subscriber has the possibility to activate or deactivate the rejection of unciphered calls, sessions or data packets at any time in a flexible manner.

BRIEF DESCRIPTION OF THE DRAWINGS

In the following, the invention will be described in greater detail by means of preferred embodiments with reference to the accompanying drawing, in which.

PREFERRED EMBODIMENTS OF THE INVENTION

Figure 1:
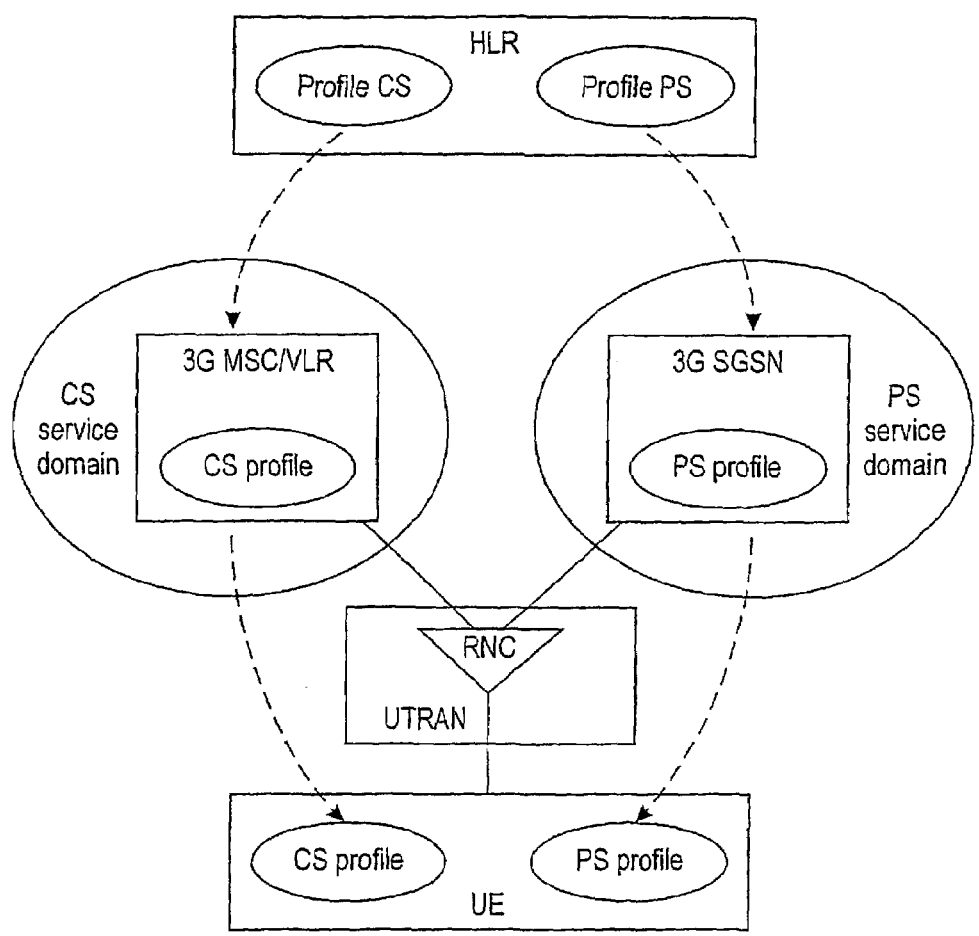
FIG. 1 illustrates circuit switched and packet switched connections within the UMTS system.

The present invention can be applied to any communications system having both ciphered and unciphered transmission of user traffic. The invention can be especially preferably used for providing a general packet radio service GPRS in the pan-European digital mobile communication system GSM (Global System for Mobile Communication) or in corresponding mobile communication systems, such as DCS1800 and PCS (Personal Communication System), or in third-generation (3G) mobile systems, such as the UMTS, implementing a GPRS-type packet radio. In the following, the preferred embodiments of the invention will be described by means of an UMTS system having GPRS and GSM core networks, without limiting the invention to this particular system. The invention can be also applied in the mobile Internet environment (such as the MIP, Mobile Internet Protocol), in which case the subscriber database may the Home Agent (HA) of the mobile host, for example. Especially in the internet environment, the subscriber equipment or the network element may be a server, and the fraudulent third party may act as such a server, i.e. impersonate such a server.

Referring again to FIG. 1, a subscriber ciphering profile of a subscriber is stored in association with other subscriber data in the home location register HLR in his/her home public land mobile network (HPLM). In this illustrating example the subscriber has subscribed to both the GPRS and GSM networks, and the HLR is common to these networks. However, there may be separate subscriber ciphering profiles (cs profile, ps profile) for the GSM and GPRS networks in the subscriber data, or there may be a subscriber ciphering profile only for the GPRS networks because it is more vulnerable to eavesdropping. The subscriber ciphering may be a 2-bit flag having two states: 11=unciphered traffic shall be rejected, 00=unciphered traffic is allowed, and 01=reauthentication is required prior to accepting unciphered traffic. The subscriber ciphering profile may, however, have more states than two. The user may also be able to change the subscriber ciphering profile in the network over the air interface. This can be readily implemented in a similar manner as the change of supplementary services, such as a call forwarding service, in the current GSM and GPRS networks.

Some of the subscriber data, including the subscriber ciphering profile, is copied to the MSCNLR or SGSN when the UE registers with the MSCNLR or the SGNS and/or when the UE is authenticated. The authentication and key agreement as well as ciphering may be as illustrated in the technical specification 3G TS 33.102 version 3.4.0 by the $3^{rd}$ Generation Partnership Project. This document is incorporated by reference herein. The exact implementation is not, however, relevant to the present invention.

Upon obtaining the subscriber ciphering profile, the MSC/VLR and the SGSN controlling the connection setup for calls or packet switched data transmission sessions can control unciphered calls and sessions as will be explained below. The MSC/VLR or the SGSN may send the subscriber profile information further to the UTRAN, or more particularly, to the serving radio network controller RNC within the UTRAN, which performs the ciphering and deciphering at the network side so that unciphered packet data transmissions originating from the UE can be controlled. The subscriber ciphering profile may be also sent to the user equipment UE so that it can handle unciphered calls or sessions as will be described below.

Let us assume that the UE wants to set up a packet switched connection via the GPRS core network and therefore sends a connection request (e.g. Activate PDP Context Request) to the SGSN, whereby the authentication and key agreement procedure is carried out between the SGSN and the UE. This may involve that the SGSN sends Authentication request data to the HLR of the UE in order to obtain a set of authentication parameters, if the SGSN does not have any unused authentication parameters obtained previously from the HLR. In the key agreement procedure a cipher key (CK) and an integrity key (IK) is obtained. The SGSN determines the UMTS integrity algorithms (UIAs) and UMTS encryption algorithms (UEAs) which are allowed to be used. Data integrity refers to a property that data has not been altered in an unauthorized manner during transmission. There may a set of different UEAs and UIAs supported by the network and the UE. The SGSN sends to the UTRAN (more particularly, to the serving radio network controller RNC within the UTRAN) a security mode command which contains a list of allowed UMTS encryption algorithms (UEAs) and UIAs as well as the agreed Integrity Key (IK) and the Ciphering Key (CK). The RNC selects from the list the first UIA and the first UEA it supports. Then the RNC sends to the UE a security command which indicates the selected UEA and UIA. If the RNC does not support anyone of the UEAs and UIAs on the list, the RNC sends a security mode reject message to the SGSN. If the UE supports the UEA and UIA selected by the RNC, it sends a security control response to the RNC, whereby integrity protection and ciphering of data and signalling messages over the air interface are initiated. If the UE does not support the selected UEA and UIA, the UE sends a security control rejected message to the RNC, and the initiating of integrity protection or ciphering fails. The RNC may select a new UIA or UEA from the list and send a new security control command, until the initiation of integrity protection and ciphering succeeds or ultimately fails. The RNC acknowledges the result to the SGSN. If the integrity protection and the ciphering was succesfully started, the SGSN completes the connection setup. However, if ciphering is not used, the SGSN checks the subscriber ciphering profile. If the subscriber ciphering profile has a value "11=unciphered traffic shall be rejected", the SGSN releases the connection. If the subscriber ciphering profile has a value "00=unciphered traffic is allowed", the SGSN completes the connection setup. Thus, unciphered traffic is accepted only when allowed according to the subscriber ciphering profile. If the subscriber ciphering profile has a value "01=reauthentication required", the SGSN will trigger a reauthentication of the UE and accept the unciphered transaction only when the reauthentication is successful.

In the packet switched transmission the UE typically reserves a physical traffic channel only for a short period of time for transmission of data packets, called sessions herein, the UE thus being idle for most of the time, while having a virtual connection to the SGSN at the same time. The UE is not authenticated each time it enters the physical traffic channel for a packet transmission session. Therefore, it is possible that a fraudulent third party UE may transmit data packets to the network in order to make the actual subscriber pay for the connection costs, for example. It is also possible that the UE begins to use unciphered transmission in the middle of the virtual connection, which would allow eavesdropping of the transmission. In order to prevent such problems, the network (such as the RNC or the SGSN) is arranged to reject any unciphered data transmission sessions if the subscriber ciphering profile does not allow unciphered user traffic. In a further embodiment of the invention, the network (such as the RNC or the SGSN) is arranged to discard all unciphered data packets which seem to be originating from the UE (and may originate from the correct UE or from a fraudulent UE) during an accepted session, if the subscriber ciphering profile does not allow unciphered user traffic. This allows for high security also during discrete data packet transmissions, although the UE is authenticated only when the virtual connection is set up. Also in these embodiments the subscriber ciphering profile may require a successful reauthentication before the unciphered user traffic is accepted.

In an embodiment of the invention, the subscriber ciphering profile is also sent to the UE, e.g. in connection with the authentication of the UE. Thus, the UE is also able to check the subscriber ciphering profile locally and to reject or accept the unciphered calls, connections or sessions accordingly, in a similar manner as described above with respect to the network side. This makes the control of unciphered calls and sessions even more reliable. Since the subscriber ciphering profile in the UE is a copy of the ciphering profile in the home subscriber data base, data integrity is maintained. Even if the user of the UE changed the subscriber ciphering profile only locally in the UE to allow an unciphered transmission, the network would not accept unciphered user traffic until the profile is changed also in the home database.

The description only illustrates preferred embodiments of the invention. The invention is not, however, limited to these examples, but it may vary within the scope and spirit of the appended claims.

The invention claimed is:

1. A method of controlling unciphered traffic in a wireless communications system comprising user equipment for communicating with a serving network by means of ciphered connections and unciphered connections, said method comprising:
   maintaining a subscriber ciphering profile for at least one subscriber equipment in a home subscriber data base of said at least one subscriber equipment, said subscriber ciphering profile defining procedures to handle unciphered user traffic; and
   using the serving network to check the subscriber ciphering profile in an unciphered transaction and a function transaction based on the subscriber ciphering profile.

2. A method according to claim 1, further comprising:
   using the serving network for checking the subscriber ciphering profile for at least one of a setup of an unciphered call, an unciphered connection, an unciphered packet switched data transmission session, and a data packet originating from said at least one subscriber equipment,
   using the serving network for regulating acceptance of at least one of the unciphered call, the unciphered connection, the unciphered packet switched data transmission session, or the data packet, and
   using the serving network for triggering a reauthentication of the subscriber equipment according to the subscriber ciphering profile.

3. A method according to claim 1, further comprising transferring said subscriber ciphering profile to a serving network when said at least one subscriber equipment performs at least one of a registration with and an authentication in the said serving network.

4. A method according to claim 1, further comprising changing the subscriber ciphering profile in said home subscriber data base using said subscriber equipment.

5. A method according to claim 1, further comprising:
   sending said subscriber ciphering profile to said at least one subscriber equipment,
   regulating acceptance of at least one of an unciphered packet switched data transmission session, an unciphered call, an unciphered connection, and a data packet of at least one subscriber equipment according to the subscriber ciphering profile.

6. A method according to claim 2, further comprising:
authenticating said at least one subscriber equipment at a setup of a virtual packet switched connection, and
regulating acceptance by said serving network, of any subsequent packet data transmission session over said virtual packet switched connection according to said subscriber ciphering profile.

7. A method according to claim 1, comprising:
authenticating said at least one subscriber equipment at a setup of a virtual packet switched connection,
receiving, by the serving network, unciphered data packets originating from said at least one subscriber equipment, and
regulating acceptance, by said serving network, of said received unciphered data packets by said serving network according to said subscriber ciphering profile.

8. A method according to claim 1, comprising:
authenticating said at least one subscriber equipment at a setup of a virtual packet switched connection,
receiving, by the serving network, unciphered data packets originating from said at least one subscriber equipment, and
in response to said reception of unciphered data packets, triggering reauthentication of said subscriber equipment by said serving network if required according to said subscriber ciphering profile.

9. A communications system, comprising:
user equipment configured to communicate with a serving network by means of ciphered connections and unciphered connections;
a home subscriber database maintaining a subscriber ciphering profile for at least one subscriber equipment, said subscriber ciphering profile defining procedures to handle unciphered user traffic; and
the serving network being configured to check the subscriber ciphering profile in an unciphered transaction and to handle the unciphered transaction according to the subscriber ciphering profile.

10. A system according to claim 9, wherein the serving network is configured to check the subscriber ciphering profile for at least one of a setup of an unciphered call, a setup of an unciphered connection, an unciphered packet switched data transmission session, and a data packet originating from said at least one subscriber equipment,
wherein the serving network is configured to regulate acceptance of the unciphered call, the unciphered connection, the unciphered packet switched data transmission session, and the data packet, and
wherein the serving network is configured to trigger reauthentication of the subscriber equipment according to the subscriber ciphering profile.

11. A system according to claim 10, wherein said home database is configured to send said subscriber ciphering profile to said serving network when said at least one subscriber equipment performs at least one of a registration with and an authentication in said serving network.

12. A system according to claim 9, comprising means for changing the subscriber ciphering profile in said home subscriber database using said subscriber equipment.

13. A system according to claim 9, wherein the serving network is configured to send said subscriber ciphering profile to said at least one subscriber equipment, and
wherein said at least one subscriber equipment is configured to regulate acceptance of at least one of an unciphered packet switched data transmission session, an unciphered call, an unciphered connection and a data packet at said at least one subscriber equipment according to the subscriber ciphering profile.

14. A system according to claim 9, wherein said serving network is configured to authenticate said at least one subscriber equipment at a setup of a virtual packet switched, and
wherein said serving network is configured to regulate acceptance of any subsequent packet data transmission session over said virtual packet switched connection according to said subscriber ciphering profile.

15. A system according to claim 9, wherein said serving network is configured to authenticate said at least one subscriber equipment at a setup of a virtual packet switched,
wherein said serving network is configured to respond to receiving unciphered data packets originating from said at least one subscriber equipment, and
wherein said serving network is configured to regulate acceptance of said received unciphered data packets in accordance to said subscriber ciphering profile.

16. A system according to claim 9, wherein said serving network is configured to authenticate said at least one subscriber equipment at the setup of a virtual packet switched,
wherein said serving network is configured to respond to receiving unciphered data packets originating from said at least one subscriber equipment, and
wherein said serving network is configured to reauthenticate said subscriber equipment if required according to said subscriber ciphering profile.

17. Subscriber equipment for a communications system wherein user equipment is configured to communicate with a serving network by means of ciphered connections and unciphered connections,
the subscriber equipment is configured to receive from said serving network a subscriber ciphering profile maintained in a home subscriber database of the subscriber equipment, and
the subscriber equipment is configured to check the subscriber ciphering profile in an unciphered transaction and to handle the transaction according to the subscriber ciphering profile.

18. A subscriber equipment according to claim 17, wherein the subscriber equipment is configured to check the subscriber ciphering profile for at least one of a setup of an unciphered call, an unciphered connection, for each]an unciphered packet switched data transmission session, a data packet originating from said at least one subscriber equipment,
wherein the subscriber equipment is configured to regulate acceptance of the unciphered call, the unciphered connection, the unciphered packet switched data transmission session, or the data packet, and
the subscriber equipment is configured to trigger a reauthentication of the subscriber equipment according to the subscriber ciphering profile.

19. A subscriber equipment according to claim 17, wherein the subscriber equipment is provided with means for changing the subscriber ciphering profile in said home subscriber data base.

* * * * *